2,876,243
POLYHALOALKENYLDITHIOCARBAMATES

Marion W. Harman, Nitro, and John J. D'Amico, Charleston, W. Va., assignors to Monsanto Chemical Company, St. Louis, Mo., a corporation of Delaware No Drawing. Application November 7, 1955
Serial No. 545,552

8 Claims. (Cl. 260—455)

The present invention relates to polyhalogen substituted lower alkenyl esters of dithiocarbamic acids. More particularly, the present invention relates to new polyhaloalkenyldithiocarbamates which comprise outstanding herbicides, especially grass-specific herbicides and to methods for their preparation. The particular halogen, whether chlorine, bromine, fluorine or iodine or mixtures thereof, does not appear to be significant. However, the presence of more than one halogen atom in a lower alkenyl group significantly increases the activity.

The new compounds comprise the structure

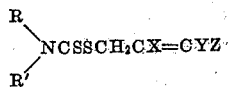

where R and R' represent acyclic groups containing less than 4 carbon atoms in an uninterrupted chain and X, Y and Z are hydrogen or halogen, at least two of which are halogen. Thus, R and R' may contain more than 4 carbon atoms providing the chain is interrupted at a point not more than 3 carbon atoms from the nitrogen.

A convenient method of preparation is to condense a soluble salt of a dithiocarbamic acid with a haloolefin containing three or more halogen atoms under such conditions that only one of the halogen atoms is removed by double decomposition to form an ester containing a polyhaloalkenyl group. Soluble metal salts of dithiocarbamates and polyhaloolefins react readily in aqueous medium but other methods of synthesis may be used if desired. Suitable polyhaloolefins include cis-1,2,3-trichloropropene, trans-1,2,3-trichloropropene and 3-bromo-1-chloro-2-fluoro-1-propene. The last is described by Hatch and McDonald, Jour. Am. Chem. Soc., 74, 2911 (1952). Examples of the new compounds are the cis- and trans-2,3-dichloroallyl, 3,3'-dichloroallyl, 2,3-dibromallyl, 3,3'-dibromallyl and 3-chloro-2-fluoroallyl esters of dimethyl-, diethyl-, dipropyl-, diallyl-, diisopropyl- and dimethoxyethyl-dithiocarbamic acids.

The following examples illustrate in detail the preparation and properties of some of the new compounds but are not to be taken as limitative.

Example 1

To a stirred charge containing 73.14 grams (1.0 mole) of diethylamine, 160 grams (1.0 mole) of 25% sodium hydroxide and 1,000 grams of water was added dropwise at 20-25° C. over a 15 minute period, 76 grams (1.0 mole) of carbon disulfide and stirring continued for an additional hour. Next there was added 145.23 grams (1.0 mole) of cis- and trans-1,2,3-trichloropropene in one portion and the reaction mixture heated at 50-60° C. for 3 hours. After cooling to 25° C., the reaction mixture was extracted with 500 ml. of ethyl ether. The ether solution was washed with water until the washings were neutral to litmus, dried over sodium sulfate and the ether removed in vacuo. The cis- and trans-2,3-dichloroallyl diethyldithiocarbamate, an amber oil, was obtained in 67.6% theory yield. Analysis gave 5.54% nitrogen, 24.05% sulfur and 27.60% chlorine as compared to 5.42% nitrogen, 24.83% sulfur and 27.46% chlorine calculated for $C_8H_{13}Cl_2NS_2$.

Example 2

The amine employed in this example, namely 2,2'-dimethoxydiethylamine, was obtained by adding dropwise at 70-80° C. over a period of 40 minutes 87 grams (0.92 mole) of 2-chloroethyl methyl ether to 263 grams (2.27 moles) of 65% 2-methoxyethylamine. After addition was complete, the stirred reaction mixture was heated at 80-85° C. for 24 hours, cooled to 25° C. and 40 grams (1.0 mole) of solid sodium hydroxide added in one portion. Stirring was then continued for one-half hour, the reaction mixture filtered, the organic layer separated and dried over caustic. The dried organic layer was distilled, collecting the fraction B. P. 169-170° C. at atmospheric pressure.

The dithiocarbamate was produced by the same procedure as described in Example 1 but employing as reactants 39.96 grams (0.3 mole) of 2,2'-dimethoxydiethylamine, 48 grams (0.3 mole) of 25% sodium hydroxide, 250 grams of water, 22.8 grams (0.3 mole) of carbon disulfide and 43.6 grams (0.3 mole) of cis- and trans-1,2,3-trichloropropene. The cis- and trans-2,3-dichloroallyl bis(2-methoxyethyl)dithiocarbamate was obtained as a dark amber oil in 71.5% theory yield. Analysis gave 4.31% nitrogen, 19.43% sulfur and 22.87% chlorine as compared to 4.40% nitrogen, 20.14% sulfur and 22.28% chlorine calculated for $C_{10}H_{17}Cl_2NO_2S_2$.

Example 3

Substituting 1,1,3-trichloro-1-propene for the cis- and trans-1,2,3-trichloropropene in Example 2, the 3,3-dichloroallyl bis(2-methoxyethyl)dithiocarbamate was obtained as an amber oil in 64.2% theory yield. Analysis gave 4.33% nitrogen, 19.45% sulfur and 22.96% chlorine as compared to 4.40% nitrogen, 20.14% sulfur and 22.28% chlorine calculated for $C_{10}H_{17}Cl_2NO_2S_2$.

By a process similar to that set out in Example 1, other examples of the polyhalogen substituted lower alkenyl esters were prepared. The structure and analytical data on the amber oils obtained are summarized below:

| Example No. | Structural Formula | | Analysis | |
|---|---|---|---|---|
| | | | Calcd., percent | Found, percent |
| 4 | [(CH₃)₂CH]₂NCSSCH₂CCl=CHCl | N<br>S | 4.89<br>22.40 | 4.93<br>21.98 |
| 5 | [(CH₃)₂CH]₂NCSSCH₂CF=CHCl | N<br>S | 5.33<br>24.41 | 5.91<br>24.29 |
| 6 | [(CH₃)₂CH]₂NCSSCH₂C(Cl)=CHCl | N<br>S<br>Cl | 4.89<br>22.40<br>24.77 | 4.85<br>22.21<br>24.59 |
| 7 | [(CH₃)₂CH]₂NCSSCH₂C(Cl)=CHCl | N | 4.89 | 4.65 |
| 8 | [(CH₃)₂CH]₂NCSSCH₂CH=CCl₂ | N<br>S<br>Cl | 4.89<br>22.40<br>24.77 | 5.05<br>22.34<br>24.60 |
| 9 | (CH₂=CHCH₂)₂NCSSCH₂CCl=CHCl | N<br>S<br>Cl | 4.97<br>22.72<br>25.12 | 5.15<br>22.53<br>25.20 |
| 10 | CH₂=CHCH₂\NCSSCH₂CCl=CHCl / (CH₃)₂CH | N | 4.93 | 5.06 |
| 11 | (C₂H₅)₂NCSSCH₂C(Cl)=CHCl | N<br>S | 5.42<br>24.83 | 5.33<br>24.14 |
| 12 | (C₂H₅)₂NCSSCH₂C=CH with Cl Cl | N<br>S<br>Cl | 5.42<br>24.83<br>27.46 | 5.46<br>24.38<br>28.17 |
| 13 | (C₂H₅)₂NCSSCH₂CH=CCl₂ | N<br>S<br>Cl | 5.42<br>24.83<br>27.46 | 5.48<br>24.72<br>26.90 |

It is intended to cover all changes and modifications of the examples of the invention herein chosen for purposes of disclosure which do not constitute departures from the spirit and scope of the invention. This application is a continuation-in-part of application Serial No. 470,836, filed November 23, 1954.

What is claimed is:
1. A compound of the structure

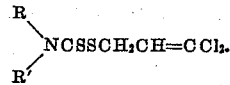

where R and R' represent acyclic groups in which the carbon to carbon valences are not greater than two selected from the group consisting of alkyl radicals containing less than four carbon atoms, alkenyl radicals containing less than four carbon atoms and lower acyclic oxy substituted derivatives thereof and X, Y and Z are selected from the group consisting of hydrogen and halogen, at least two of which are halogen.

2. A compound of the structure

where R and R' represent alkyl radicals containing less than 4 carbon atoms.

3. A compound of the structure

where R and R' represent alkyl radicals containing less than 4 carbon atoms.

4. A compound of the structure (C₂H₅)₂NCSSCH₂CCl=CHCl

5. A compound of the structure

[(CH₃)₂CH]₂NCSSCH₂CCl=CHCl

6. A compound of the structure

[(CH₃)₂CH]₂NCSSCH₂CF=CHCl

7. A compound of the structure (C₂H₅)₂NCSSCH₂CH=CCl₂

8. A compound of the structure

[(CH₃)₂CH]₂NCSSCH₂CH=CCl₂

References Cited in the file of this patent
UNITED STATES PATENTS
2,425,426    Joyce _____ Aug. 12, 1947